United States Patent
Cili

(10) Patent No.: US 10,756,986 B2
(45) Date of Patent: Aug. 25, 2020

(54) NOTIFICATIONS WITH INPUT-BASED COMPLETION

(71) Applicant: Apple Inc., Cupertino, CA (US)

(72) Inventor: Gencer Cili, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/255,792

(22) Filed: Jan. 23, 2019

(65) Prior Publication Data

US 2019/0222487 A1 Jul. 18, 2019

Related U.S. Application Data

(63) Continuation of application No. 14/038,589, filed on Sep. 26, 2013, now Pat. No. 10,218,582.

(51) Int. Cl.
| | |
|---|---|
| *H04M 1/725* | (2006.01) |
| *H04L 12/24* | (2006.01) |
| *G06F 3/0488* | (2013.01) |
| *G06F 3/0482* | (2013.01) |

(52) U.S. Cl.
CPC ............ *H04L 41/22* (2013.01); *G06F 3/0482* (2013.01); *G06F 3/0488* (2013.01); *H04M 1/72566* (2013.01); *H04M 1/72572* (2013.01)

(58) Field of Classification Search
CPC ................ G06F 3/0482; G06F 3/0488; H04M 1/72566; H04M 1/72572
See application file for complete search history.

(56) References Cited

U.S. PATENT DOCUMENTS

| | | |
|---|---|---|
| 6,587,782 B1 | 7/2003 | Nocek et al. |
| 7,251,782 B1 | 7/2007 | Albers et al. |
| 8,587,402 B2 | 11/2013 | O'Shaughnessy et al. |
| 8,924,869 B2 | 12/2014 | Fellman |
| 8,971,924 B2 * | 3/2015 | Pai ...................... H04W 64/006 455/456.2 |
| 9,008,629 B1 | 4/2015 | Masterman |
| 10,218,582 B2 | 2/2019 | Cili |
| 2002/0086680 A1 | 7/2002 | Hunzinger |
| 2006/0276180 A1 | 12/2006 | Henry |
| 2007/0109301 A1 | 5/2007 | Smith |
| 2008/0301703 A1 | 12/2008 | Nixon et al. |
| 2010/0026526 A1* | 2/2010 | Yokota ............. G08G 1/096827 340/996 |
| 2010/0162209 A1 | 6/2010 | Brown et al. |

(Continued)

*Primary Examiner* — Dino Kujundzic
(74) *Attorney, Agent, or Firm* — Dickinson Wright RLLP

(57) ABSTRACT

Techniques are disclosed for presenting notifications that can receive input data. The techniques include presenting a notification in response to occurrence of an event, wherein the notification is associated with a specified data type and a data source from which data is to be received, receiving input data of the specified data type from the data source, wherein the notification is presented until the input data is received, and storing the input data. The notification can block access to a user interface of at least one application until the input data is received. The data source can be a data entry component of a user interface that receives user input, or can be an application that provides data of the specified data type, and receiving input data can include requesting data of the specified data type from the application, and receiving the input data from the application via inter-process communication.

20 Claims, 5 Drawing Sheets

(56) References Cited

U.S. PATENT DOCUMENTS

| | | |
|---|---|---|
| 2011/0183711 A1 | 7/2011 | Melzer |
| 2012/0112908 A1 | 5/2012 | Prykri et al. |
| 2012/0245447 A1* | 9/2012 | Karan ................ A61B 5/14532 600/365 |
| 2012/0306659 A1 | 12/2012 | Ben-Dayan et al. |
| 2012/0311583 A1* | 12/2012 | Gruber ................ G06Q 10/109 718/100 |
| 2013/0059561 A1 | 3/2013 | Leemet et al. |
| 2013/0065569 A1* | 3/2013 | Leipzig .................. G06F 9/453 455/416 |
| 2013/0110940 A1 | 5/2013 | Pasquero et al. |
| 2013/0346408 A1 | 12/2013 | Duarte et al. |
| 2014/0082633 A1 | 3/2014 | Kim et al. |
| 2014/0241540 A1 | 8/2014 | Hodges et al. |
| 2014/0247383 A1 | 9/2014 | Dave et al. |
| 2015/0088624 A1* | 3/2015 | Frederick ........... G06Q 30/0209 705/14.12 |
| 2015/0121227 A1* | 4/2015 | Peng ...................... G10L 13/02 715/727 |
| 2015/0350807 A1 | 12/2015 | Andrews et al. |
| 2015/0350885 A1 | 12/2015 | Stanley-Marbell et al. |
| 2015/0370884 A1 | 12/2015 | Hurley et al. |
| 2016/0248900 A1 | 8/2016 | Kim et al. |
| 2018/0013579 A1 | 1/2018 | Fairweather et al. |

\* cited by examiner

NOTIFICATIONS WITH INPUT-BASED COMPLETION

CROSS-REFERENCE TO RELATED APPLICATIONS

The present application is a continuation of U.S. application Ser. No. 14/038,589, entitled "NOTIFICATIONS WITH INPUT-BASED COMPLETION," filed Sep. 26, 2013, issued Feb. 26, 2019 as U.S. Pat. No. 10,218,582, the content of which is incorporated herein by reference in its entirety for all purposes.

TECHNICAL FIELD

The present invention relates generally to notification of events in computer systems. More particularly, the present embodiments relate to presentation of notifications that can involve waiting for and receiving input from a user or other data source.

BACKGROUND

Computer systems can provide notifications, which can be text or other content displayed prominently to inform a user of the occurrence of an event, often soon after the event occurs. Users can create reminders that generate reminder notifications for events expected occur in the future. A computer system can maintain a list of reminders and presents notifications to the users when the events associated with the reminders occur. For example, a reminder alarm is a type of notification that causes a reminder notification to be displayed in a user interface when a certain point in time is reached. A geographic reminder is another type of notification, which causes a reminder notification to be displayed when the computer system is in a specified geographic location. An email notification can indicate that an email message has arrived by displaying a portion of the message. The notifications can be displayed as, for example, text that disappears after a short time period, or in dialog boxes that disappear when a user provides an input acknowledging the notification. Notifications can also cause sounds to be emitted from the computer system to draw the user's attention.

SUMMARY

In one or more embodiments, notifications can be presented to a user by a computer system when certain events occur, and until a specified completion condition is met. In one example, the completion condition is met when input data is received. The received input data can be stored for later retrieval. If the notification is presented repeatedly at periodic time intervals, then a set of input data values is created, and can be used as a historical record for tasks that involve gathering periodic data. The notification can be presented in a user interface, such as a dialog box, text box, pop-up, or other interface component, to bring the notification to the user's attention. The notification user interface can have components that the user can select to enter or collect the desired data, such as a text input field, a button that opens a camera application, and so on. For example, the user can enter text, take a photograph, or perform other actions that produce the desired input data. To encourage the user to provide the input data, the notification user interface can block other applications from being used until the input data is received or the user interface is closed. For example, a user can create a reminder to check their blood pressure each day at 10:00 am. The reminder specifies that a measured blood pressure is to be received at the time of the reminder. The blood pressure input data can be received from the user via a text input field or automatically from a sensor. The received blood pressure value is stored in a storage device for later retrieval.

Reminders with inputs can be categorized according to certain attributes. A tag can be associated with a reminder, and the tag is stored in the storage device in association with the input data when input data is received. For example, a tag "Health" can be applied to health-related inputs such as calories burnt per day, blood pressure, body mass index, and so on. The tag feature enables a user to set future notifications that occur based upon a combination of the input data, such as a reminder that causes a notification when the body mass index exceeds a certain value.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
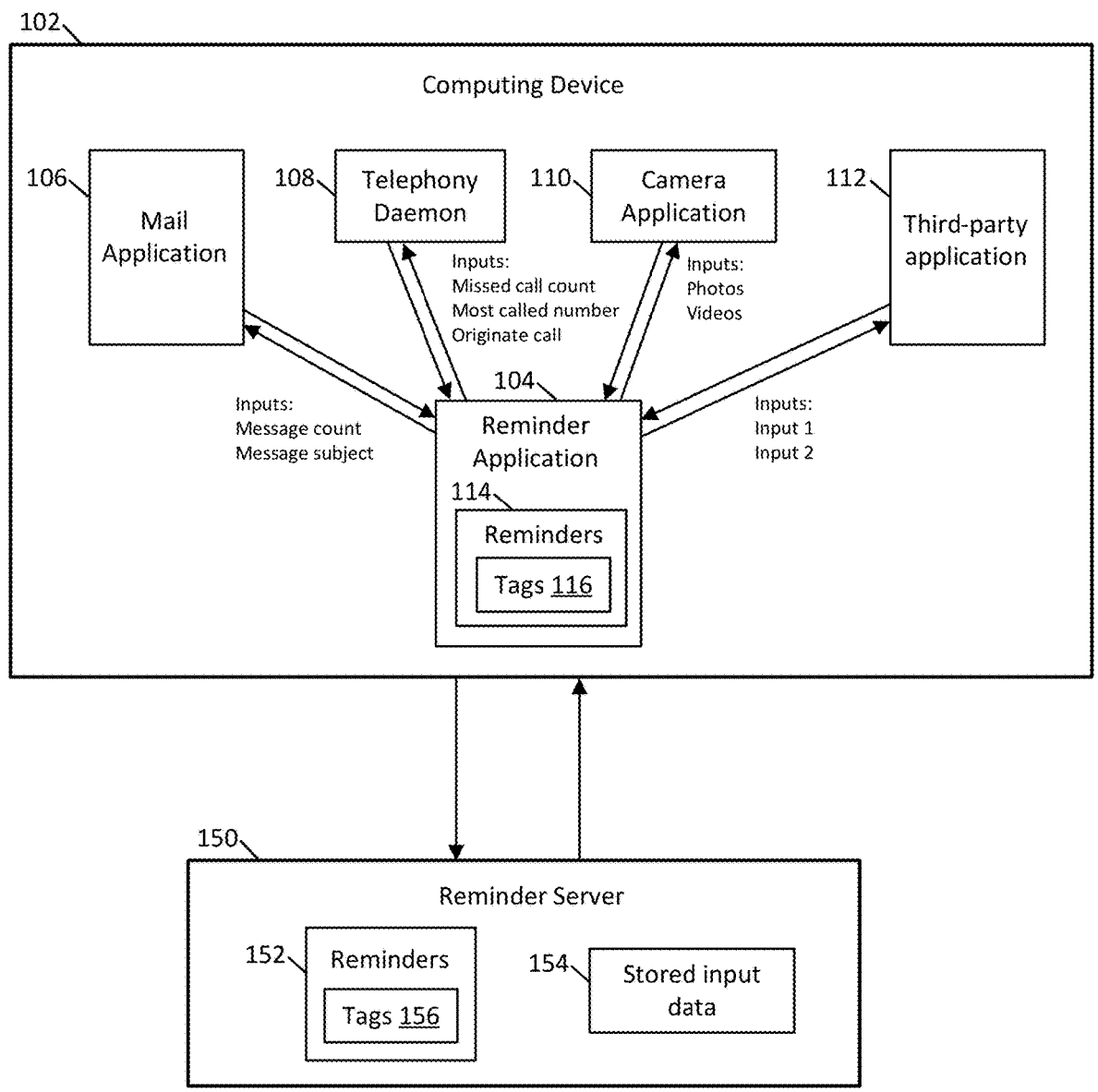
FIG. 1 is an illustrative drawing of a reminder notification system in accordance with one or more embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In one or more embodiments, notifications can be presented to a user by a computer system when certain events occur, and until a specified completion condition is met. That is, the notification is presented, e.g., displayed, until it is "completed." In one example, the completion condition is met when input data is received. The received input data can be stored for later retrieval, e.g., on a server or on a local storage device. If the notification is presented repeatedly at periodic time intervals, then a set of input data values is created, and can be used as a historical record for tasks that involve gathering periodic data. The notification can be presented in a notification user interface, such as a dialog box, text box, pop-up, or other interface component that can bring the notification to the user's attention. The notification user interface can have components that the user can select to enter or collect the desired data, such as a text input field, a button that opens a camera application, and so on. For example, the user can enter text, take a photograph, or perform other actions that produce the desired input data. The notification user interface is displayed until the input data is received or the interface is dismissed or closed. That is, when the input data has been received, the particular notification is completed, and is no longer presented to the user. As an example, a user can create a reminder that reminds the user to check their blood pressure each day at 10:00 am. The user specifies that a measured blood pressure is to be received at the time of the reminder, either from the user via a text input field or automatically from a sensor. The reminder is displayed until the input is received, to encourage the user to provide the input. The received blood pressure value is stored in a storage device for later retrieval.

In another aspect, the input data can be received automatically from a data source in the computer system, instead of from the user. The notification can be presented to the user and displayed until the input data is received, and the user acknowledges the notification. Alternatively, the input data can be requested from the internal source, and, if received, the notification is not presented to the user and user input is not requested for the notification.

If input data is not available from the internal source, then the notification can be presented to the user until the input data is received from the user. For example, a reminder that has a temperature value as input can retrieve the temperature value from a weather application or a temperature sensor. As another example, a reminder to check a stock portfolio each week can automatically retrieve the stock portfolio information from an online service. In another example, a project manager can track the frequency of email communications between team members using a periodic reminder to check a count of emails each day. The reminder can query an email application (e.g., using an inter-process communication call) to retrieve the mail count for the current day. The mail count can then be stored, e.g., on a reminder server.

FIG. 1 is an illustrative drawing of a reminder notification system in accordance with one or more embodiments. As shown in FIG. 1, reminders are extended to receive input when the reminders' notifications occur. The notifications remain visible and active until the input is received. These features can simplify the tracking of progress over time, particularly for periodic events. For example, a construction manager may want to track construction progress. The manager can create a reminder to generate a picture of the construction site each time he visits the construction site. If he visits the site once a month, a periodic reminder can be used to remind him to take a picture. As another example, a geographic reminder can be used to remind the manager to take the picture when he arrives at the construction site.

When the reminder is triggered and displayed, a message appears on a computing device 102 asking the manager to press a user interface button to open a camera application, and take a photograph with the camera. The reminder is displayed until the button is pressed. When the manager presses the button and takes the photo, the photo is stored for later retrieval, and the reminder completes and disappears from the device's display. In one or more embodiments, the input data is stored on a reminder server 150 as stored input data 154. The device 102 can communicate with the reminder server 150 via a network such as the Internet. The data storage can be implemented by allocating memory in association with each reminder at the server 150 and storing the input data in the allocated memory for the corresponding reminder. The server thus tracks the reminder, the required input type, and the received input values for each reminder. The received input values can include a value for each notification generated by the reminder, which can be a number of values for a periodic repeating reminder. A progress chart illustrating the values can subsequently be generated based on the stored input data. If the data includes photos, a slideshow of the stored photos can be generated to display the progress.

In one or more embodiments, the reminder input can be provided either manually, e.g., by a user, or automatically, e.g., by another application. In the manual case, a user enters or the data directly or indirectly, e.g., by tying a number or text, taking a picture with a camera application, and so on.

Automatic reminder input can be implemented using communication between applications executing on the computing device 102 to send the input from an application to the reminder. The applications can be provided with the device (e.g., native applications) or by third parties. When the computing device 102 boots up, the reminder application 104 communicates with other applications 106-110 running on the device 102. The other applications declare the type(s) of input data that they can provide to the reminders application. For example, an email application 106 can specify that it provides a message count (a number of messages in a mailbox), a message subject, and other data values. The reminder application 104 receives this specification, and displays the declared input data types as selectable types in a reminder configuration user interface 200 or the like, so that the user can select one of the declared inputs (e.g., message count or message subject) as the input type for the input type field 206. As another example, a camera application 110 can declare that it provides pictures and videos as input data. Thus, an application can be selected in the reminder interface 200, and an input of that application can be selected as the source for input to reminders. In another example, telephony daemon 108 is a process that provides telephone-related features, and declares inputs similarly to the applications 106, 110, 112. The telephony daemon 108 declares that it provides a missed call count, a most frequently called number, and an input named "originate call" that, if selected causes a telephone user interface to be presented so that a call can be made.

In one or more embodiments, the criteria associated with each reminder are known and evaluated by the server 150 and/or by the reminder application 104. The reminder criteria are stored on the device 102 as part of the reminders 114 by the reminder application 104. The reminder criteria can also be stored on the server 150 as reminders 152. When the reminder application determines that the criteria are met for a particular reminder, the reminder application sends an inter-process communication (IPC) call to the application that provides the input data for that reminder (according to the reminder interface 200). This IPC call indicates that input data may soon be requested from the providing application (e.g. the camera application 110, so that the application can perform any initialization steps that may be appropriate). For example, the camera application 110 can initialize the camera hardware in response to this initialization IPC call so that a subsequent request for a photo can be completed more quickly. The reminder application 114 can also generate a notification to cause the reminder to be displayed in a user interface.

Each of the reminders 114 in the reminder application 104 can be associated with one or more tags 116. A tag can be, for example, a label or a name with an optional attribute value. Each of the inputs can be associated with a tag. For example, a body mass index input can be associated with the tag BMI. Users can add tags or name-value attributes to reminders or to inputs of reminders via the reminder application 104. The tags or attributes associated with a reminder or the reminder's inputs are stored on the reminder server 150 as tags 156 within or in association with the stored reminders 152. Tags can be used to, for example, group health-related inputs such as calories burnt per day, blood pressure, and weight by tagging them with the same attribute. These tags or attributes can be used to define notifications that use a combination of the input data, such as a minder that generates a notification when the BMI (body mass index input) exceeds a predetermined value.

Figure 2A:
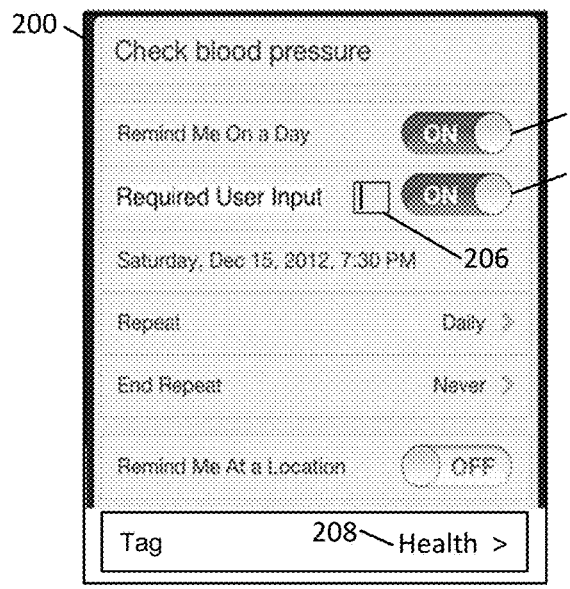
FIGS. 2A and 2B are illustrative drawings of user interfaces for defining reminders that can receive input in accordance with one or more embodiments.
Figure 2B:
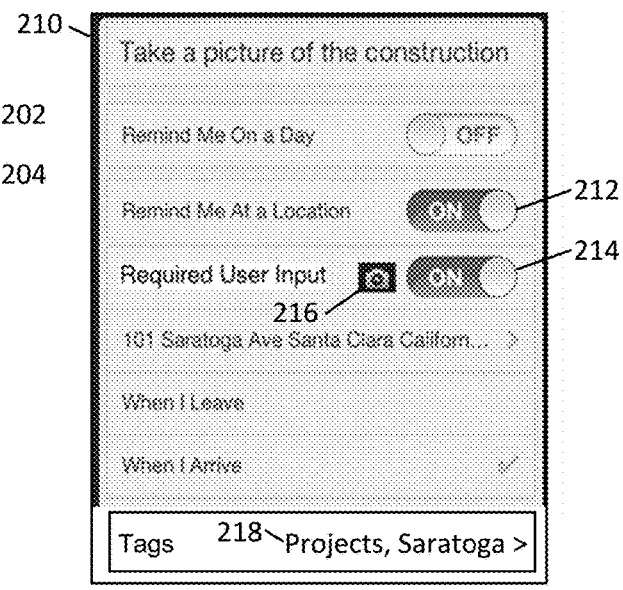

FIGS. 2A and 2B are illustrative drawings of user interfaces for defining reminders that can receive input in accordance with one or more embodiments. The user interfaces of FIGS. 2A and 2B can be presented by, for example, a reminder application such as that provided with the iOS® operating system for the iPhone® or iPad® devices, or the Mac OS X operating system, both of which are available from Apple Inc. of Cupertino, Calif. Reminders have associated criteria, such as a date or location at which the reminder is to generate a notification. The criteria can be specified in the user interfaces of FIGS. 2A and 2B. FIG. 2A shows a time-based reminder having an associated day and time at which the reminder notification is to be displayed (Saturday, Dec. 15, 2012, 7:30 PM). FIG. 2B shows a location-based reminder a location at which the reminder notification is to be displayed (101 Saratoga Ave, Santa Clara, Calif.). Note that reminders and the reminders application are used as examples. The techniques discussed herein are not limited to use with reminders, and can be used with other types of notifications, such as alarms in a clock application, notifications in calendar, email, or text messaging applications, and so on.

The user interfaces of FIGS. 2A and 2B can be used to enable, disable, and configure options for a "required input" option that can be associated with each reminder. Setting the required input option to "On" using the switch 204 causes the reminder notification to request and wait for an input from a user or other source. An input data type can be specified when the required input option is enabled at the input type field 206. If the input data type is specified, the input received from the user or other source is interpreted as a value of that data type. For example, the data type can be set to a numeric type, in which case the input is converted to a numeric value. If the input does not contain data that can be converted to a numeric value, then an error can be generated indicating that the input is invalid. When the input is invalid, another input value can be requested until a value that can be converted to a numeric value is received. Alternatively, such a non-conforming input value can be discarded without requesting another input value, in which case no input is received for the particular notification. The data type can be set to other types, such as a text type that accepts alphanumeric data, a photo type that accepts photographs, and so on.

FIG. 2A shows a time-based reminder configured to require numeric user input. The time-based reminder's message has been set to "Check blood pressure" by the user. The reminder message is displayed when the reminder's criteria, e.g., a particular time being reached, is met and a notification is generated, such as that shown in FIG. 3A below. The "Remind Me On a Day" switch 202 is in the "On" position, which indicates that the reminder causes a notification to be presented on a specified day. A user can set a "Required User Input" switch 204 to an "On" position to cause the reminder to require user input. In FIG. 2A, the "Required User Input" switch 204 is in the "On" position, so the reminder's notification, when presented, is to be presented until user input is received (or the reminder is otherwise closed, e.g., by selection of a Close button). A user can specify a data type to which the reminder's required input is to confirm. For example, a list of possible input data types can be displayed, and the user can select one of the types from the list. In this example, the required input's type is numeric, i.e., a number is expected to be provided as input. The text input type field 206 indicates that the reminder requires numeric input. Other types of input are possible, such as alphabetic or alphanumeric text, and these other types can be represented by corresponding icons in the position of the text input type field 206. Tags can be associated with the reminder using the interface 200. A Health tag 208 is shown, but the tag can have any desired value. The user can enter a tag using a keyboard or select the tag from a list.

When the Check Blood Pressure reminder is presented, the notification interface 300 shown in FIG. 3A below is displayed, and the user can select a text field 304 to activate a text field into which the user can enter a number. The notification interface 300 is displayed until the user selects the text field 304 and enters a number, or the user selects the Close button 302. The tag(s) or attribute(s) associated with a reminder or with the reminder's inputs can be displayed in the notification interface 300. Once the number has been entered, the notification user interface disappears, and the received number is stored in a database or other storage medium. The value of the tag, e.g., "Health", can be stored in association with the number.

FIG. 2B shows a location-based reminder configured to require numeric input. The location-based reminder's message has been set to "Take a picture of the construction" by the user. The "Remind Me At a Location" switch 212 has been set to "On" to indicate that the reminder causes a notification to be presented when the computing device is at a specified geographic location. The "Required User Input" switch 214 is set to the "On" position to indicate that the reminder's notification is to be presented until user input is received. The type of the required user input, i.e., the type of the data that, when received, causes the reminder to complete, has been set to a photograph type 216 by the user. Tags can be associated with the photo reminder using the interface 210. Two tags 218, Projects and Saratoga, are associated with the photo reminder.

When the photo reminder is presented, the notification interface 310 shown in FIG. 3B below is displayed, and the user can select a button 314 to activate a camera application and take a photo. The notification interface 310 is displayed until the user selects the photo button 314 and takes a photo, or the user selects the Close button 312. Once the photo has been taken, the notification user interface disappears.

Note that the phrase "required input" as used herein indicates that the reminder accepts input when the user is notified of the reminder's occurrence, and can prevent the reminder from being dismissed by an acknowledgement such as selecting an OK option. However, the requirement for input is not necessarily absolute, since the user can dismiss the reminder without providing input in one or more embodiments, e.g., by selecting a Close option when the reminder notification is displayed. The Close option does not necessarily complete the reminder, so the reminder can be presented again (if the reminder system is so configured), but the Close option can permit a user to close the reminder without providing the required input.

Figure 3A:
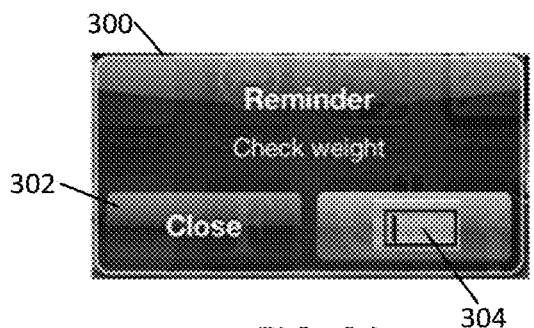
FIGS. 3A and 3B are illustrative drawings of reminder notification user interfaces that can receive input in accordance with one or more embodiments.
Figure 3B:
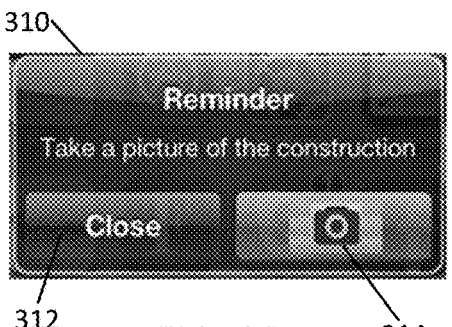

FIGS. 3A and 3B are illustrative drawings of reminder notification user interfaces that can receive input in accordance with one or more embodiments. The notification interfaces 300, 310 can be presented when the reminder criteria associated with the reminders defined in the respective reminder configuration user interface 200, 210 are met. More specifically, the notification interface 300 is a time-based notification that can be displayed when the date and time associated with the reminder interface 200 arrive. The notification interface 300 can block an existing application user interface that was being displayed prior to the notification, so that the user cannot continue to use the existing application until input is provided or the notification is explicitly closed, i.e., cancelled without providing input. Blocking an application user interface can include overlaying the notification on the application interface, diverting user input from the application user interface to the notification user interface, or the like. That is, the notification interface 300 is displayed until the reminder is completed by receipt of input data in an input field 304, or dismissed by a Close button 302. Since the input data type 206 associated with the reminder is a numeric type in the examples of FIGS. 3A and 3B, the input field 304 is a numeric input field into which a user can enter a number or select a number from a list. When a number is successfully received in the input field 304, the reminder notification interface 300 disappears, and the user can continue using the existing application or other applications.

The notification interface 310 is similar to the notification interface 300, but has a photo input type 216, and displays a photo input button 314. The notification interface 310 is a location-based notification that can be displayed when the computing device's geographic location matches the location associated with the reminder interface 210. When the notification interface 310 is displayed, the user can select the photo input button 314 to take a photo to be used as the input data for the reminder. For example, when the user selects the photo button 314, a camera application can be presented to enable the user to take a photo that becomes the input data for the reminder. When the photo has successfully been received, the reminder is complete, and the notification interface 310 disappears. Alternatively, the user can select the Close button 312 to dismiss the reminder without providing input. In either case, the user can then continue using the existing application or other applications.

In one or more embodiments, the input data received by the reminders is stored, e.g., on a reminder server, and can be retrieved from the server for display and analysis upon request. For example, a user interface can be provided to plot the graphical history of input values received for periodic reminders that have numeric inputs. This data retrieval and plotting can help users trace their progress for the reminder items, such as health condition, dietary results, weight, workout results, and so on. Reminders having input data of other types can be presented in formats appropriate for the types. For example, a photo stream can be presented to a user to display photos that were taken by a camera as inputs to a periodic reminder. Such a photo stream can be used, for example, to track a construction process by regularly taking photos of the monitored construction site.

Figure 4:
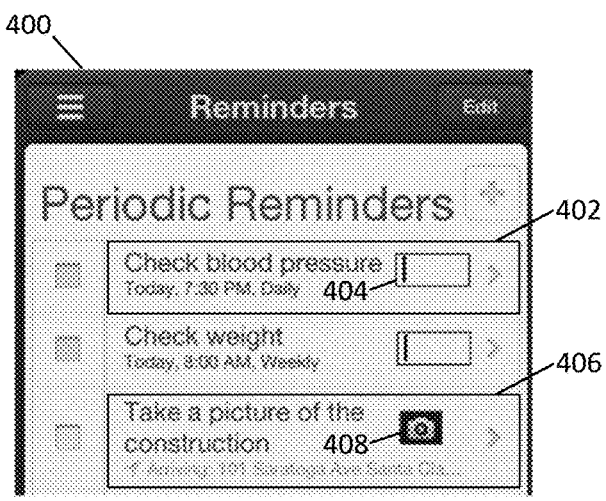
FIG. 4 is an illustrative drawing of a reminders summary user interface for displaying summaries of existing reminders in accordance with one or more embodiments.

FIG. 4 is an illustrative drawing of a reminders summary user interface 400 for displaying summaries of existing reminders in accordance with one or more embodiments. The reminder summaries are associated with checkboxes that can be used to enable or disable the existing reminders. A reminder summary 402 corresponds to the reminder interface 200 and indicates that the reminder can display the message "Check blood pressure." The reminder summary 402 includes a text input field indicator 404, which indicates that the reminder expects text input. A reminder summary 406 corresponds to the reminder interface 210 and indicates that the reminder can display the message "Take a picture of the construction." The reminder summary 406 includes a photo input field indicator 408, which indicates that the reminder accepts photos as input.

Figure 5:
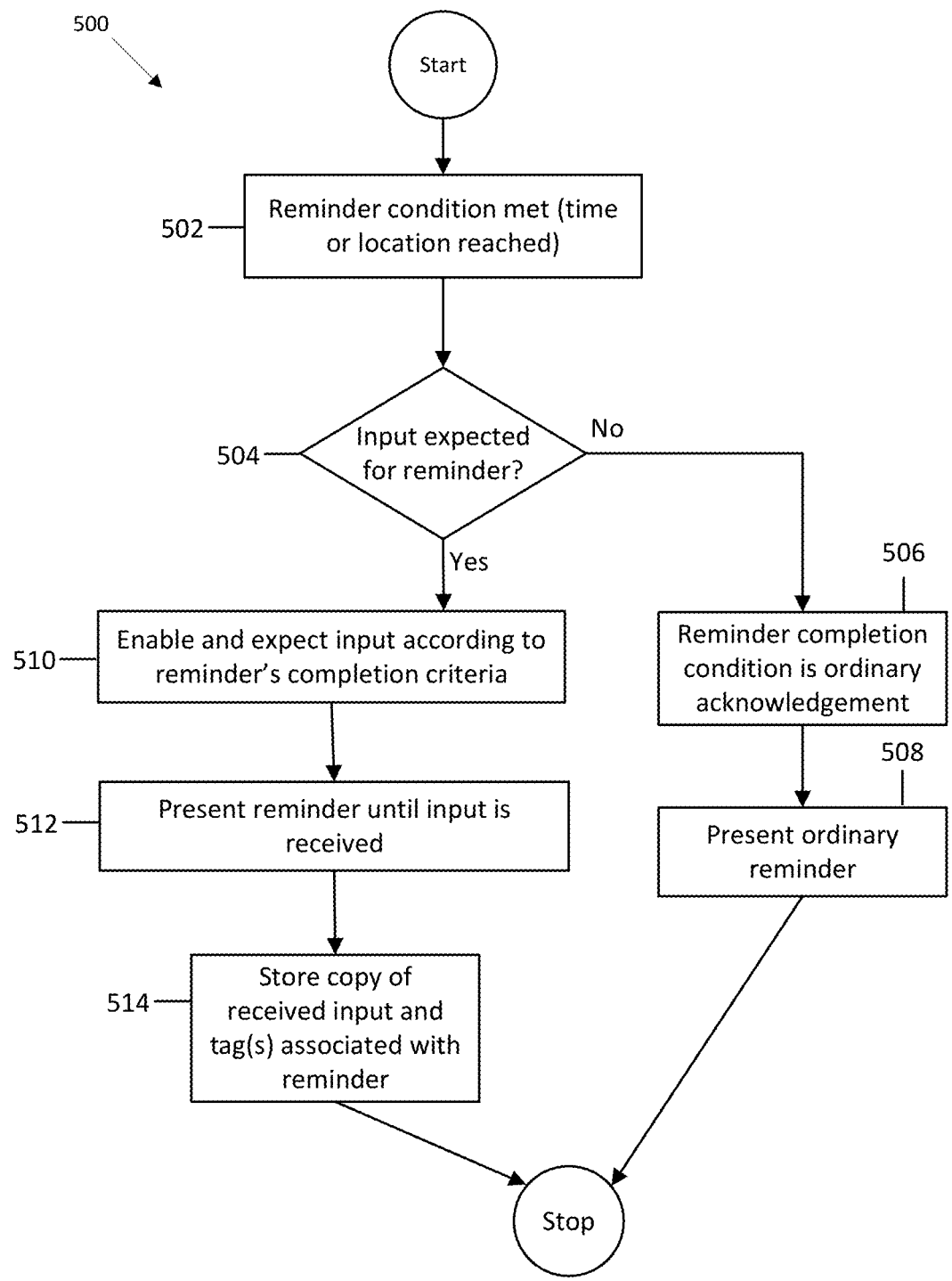
FIG. 5 is an illustrative flowchart of a process for presenting reminders with completion conditions in accordance with one or more embodiments.

FIG. 5 is an illustrative flowchart of a process for presenting reminders with completion conditions in accordance with one or more embodiments. Process 500 can be implemented as, for example, computer program code encoded on a computer readable medium and executable by a processor of a computer system. Process 500 begins at block 502 when a reminder's criteria is met, which can occur at a time or location specified by the reminder's definition. The reminder application 104, for example, can monitor the reminder criteria and, when the criteria is met for a particular reminder, send a notification that causes the process of FIG. 5 to execute. Block 504 determines whether the reminder's definition specifies that user input is required, i.e., a required user input option associated with the reminder is enabled. If required user input is not enabled, then the reminder is presented as a checkbox that can be dismissed by the user without any requirement for other user input. Block 506 indicates that the completion condition is an ordinary acknowledgment that corresponds to a Boolean (yes/no) type, and block 508 presents an ordinary reminder that can be dismissed by a simple acknowledgement (e.g., selecting an OK button or checking a checkbox). Once the user acknowledges the reminder, the reminder is complete and the reminder notification user interface disappears. Referring back to block 504, if block 504 determines that input is expected by the reminder (i.e., the reminder requires user input), then, as specified at block 510, input will be allowed and required for completion of the notification according to the completion criteria associated with the reminder (e.g., criteria specified by the user when the reminder was created). The user can specify a completion method such as receiving text data, taking a photo, taking a video, sending an email, sending a text message, and so on. For example, the reminder's definition may specify that the user is to send a text message to their aunt every time the reminder occurs, and the reminder application can interact with a text messaging application to send the text message. In this case, the reminders interact with other applications on the computer system to receive data. Block 512 causes the reminder to be presented until the input is received. Block 514 then stores a copy of the user input (e.g., text, number, photograph) so that the user can keep track of the periodic actions items. If any tags are associated with the reminder, block 514 stores the tags in association with the received input.

Figure 6:
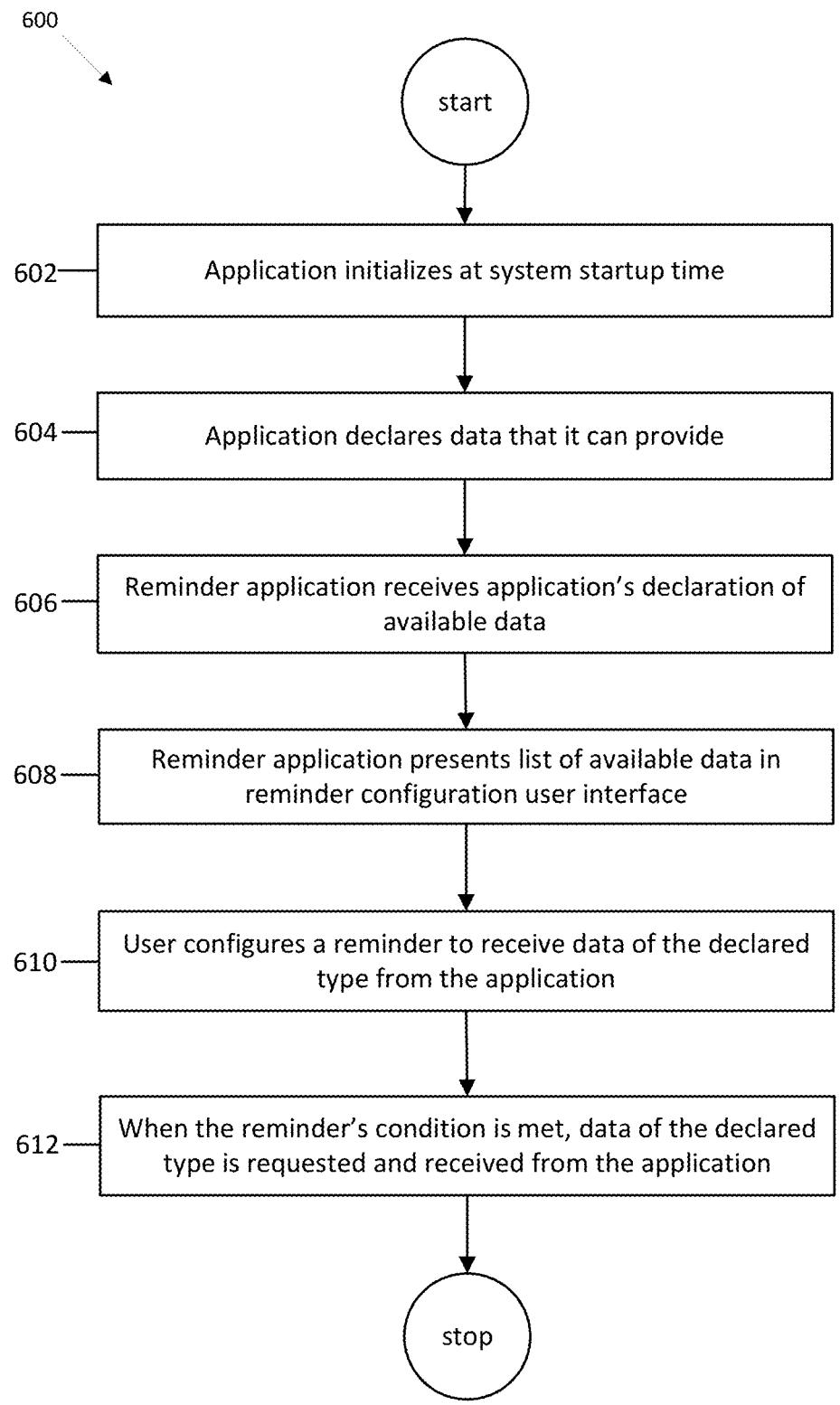
FIG. 6 is an illustrative flowchart of a process for automatically providing input to reminders from other applications in accordance with one or more embodiments.

FIG. 6 is an illustrative flowchart of a process for automatically providing input to reminders from other applications in accordance with one or more embodiments. Process 600 can be implemented as, for example, computer program code encoded on a computer readable medium and executable by a processor of a computer system. Process 600 begins at block 602 when the computer system is booted up, i.e., initialized. Block 602 is executed by each application as part of the application's initialization processes. At block 604, the application declares the type of data that it can provide. The application makes this declaration by generating a description of the names and types of data that the application can provide for consumption by other applications. For example, a camera application provides a description declaring that it can generate a data value named "Photo" of a photograph (i.e., image) type. At block 606, the data description is received by the reminder application, which uses the names and types in the description to populate a list of inputs that is used in the user interfaces 200 when the user selects an input for the input type field 206. Since the input is generated by another application, a reminder notification interface 300 is not necessarily presented to the user. Instead, when a reminder that receives input from another application is triggered by the reminder criteria becoming true, the reminder queries the application for the input value. If the input value is successfully received from the application, then the notification interface 300 need not be shown. However, in another embedment, the notification interface 300 is shown, with an indication that the input data has been collected automatically, and the user can complete the reminder by selecting an OK button or the like.

At block 608, the reminder application uses the data declaration received from the application to construct a list of potential input data items. The list is displayed in the reminder configuration interface 200 when a user creates or modifies a reminder that accepts input data. At block 610, the user selects one of the declared data items to be the input type for the reminder. Subsequently, when the reminder's condition is met, data of the declared type is requested and received from the application at block 612. The received data completes the reminder and can be stored at the server.

Figure 7:
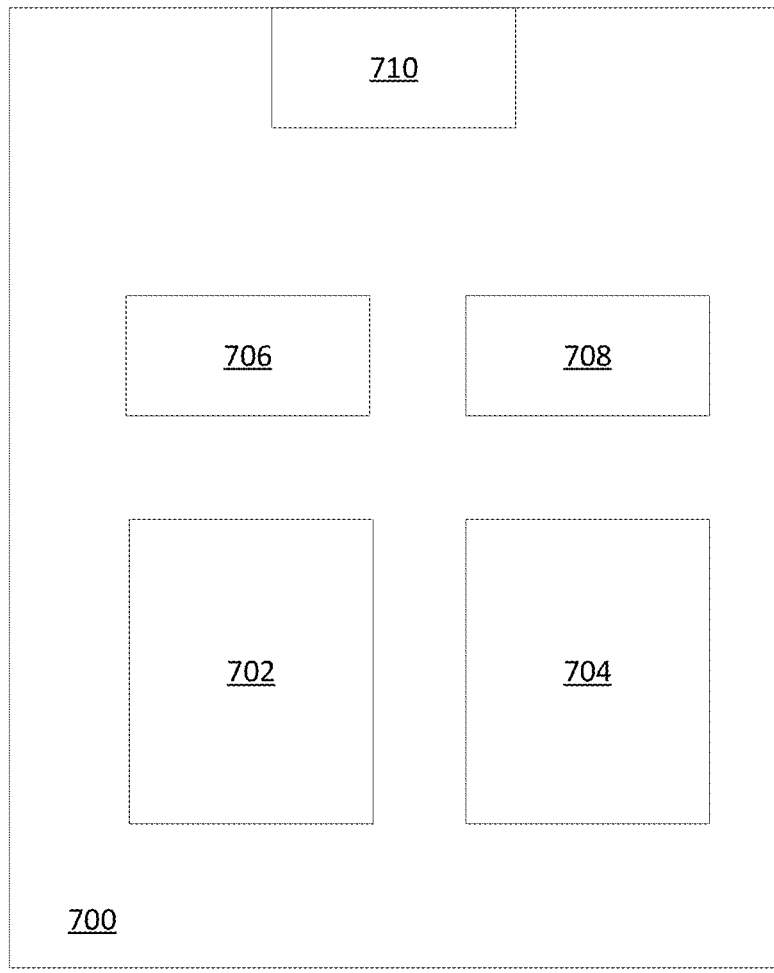
FIG. 7 shows a system block diagram of computer system used to execute the software of an embodiment.

FIG. 7 shows a system block diagram of computer system 700 used to execute the software of an embodiment. Computer system 700 includes subsystems such as a central processor 702, system memory 704, fixed storage 706 (e.g., hard drive), removable storage 708 (e.g., FLASH), and network interface 710. The central processor 702, for example, can execute computer program code (e.g., an operating system) to implement the invention. An operating system is normally, but necessarily) resident in the system memory 704 during its execution. Other computer systems suitable for use with the invention may include additional or fewer subsystems. For example, another computer system could include more than one processor 702 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for implementing notifications, the method comprising, at a notification application executing on a computing device:
    receiving a request to create a notification, wherein the request identifies:
        at least one condition that dictates when the notification is to be displayed, and
        at least one type of input data to be provided when the at least one condition is satisfied, and
    identifying at least one application associated with the at least one type of input data; and
    in response to determining that the at least one condition is satisfied:
        causing the at least one application to initialize on the computing device, and
        configuring the at least one application to provide, to the notification application, input data that is received by at least one application and conforms to the at least one type of input data;
    receiving the input data from the at least one application; and
    displaying the notification, wherein the notification includes the input data.

2. The method of claim 1, wherein the at least one condition is based on or more of a time, a date, or a location.

3. The method of claim 1, further comprising, in response to identifying that the at least one condition is satisfied:
    updating a configuration of the computing device to prevent other applications from loading until the notification is dismissed.

4. The method of claim 1, wherein the request further identifies:
    a tag associated with the notification, and
    at least one threshold associated with the tag.

5. The method of claim 4, wherein, when the at least one threshold is satisfied, the method further comprises:
    displaying a second notification associated with the at least one threshold.

6. The method of claim 1, wherein causing the at least one application to initialize on the computing device comprises:
    causing the at least one application to initialize at least one hardware component utilized to obtain the input data.

7. The method of claim 1, further comprising, subsequent to displaying the notification:
    receiving a second request to dismiss the notification; and
    storing the input data.

8. At least one non-transitory computer readable storage medium configured to store instructions that, when executed by at least one processor included in a computing device, cause the computing device to implement a notification application, by carrying out steps that include:

receiving a request to create a notification, wherein the request identifies:
  at least one condition that dictates when the notification is to be displayed, and
  at least one type of input data to be provided when the at least one condition is satisfied, and
identifying at least one application associated with the at least one type of input data; and
in response to determining that the at least one condition is satisfied:
  causing the at least one application to initialize on the computing device, and
  configuring the at least one application to provide, to the notification application, input data that is received by at least one application and conforms to the at least one type of input data;
receiving the input data from the at least one application; and
displaying the notification, wherein the notification includes the input data.

9. The at least one non-transitory computer readable storage medium of claim 8, wherein the at least one condition is based on or more of a time, a date, or a location.

10. The at least one non-transitory computer readable storage medium of claim 8, wherein the steps further include, in response to identifying that the at least one condition is satisfied:
  updating a configuration of the computing device to prevent other applications from loading until the notification is dismissed.

11. The at least one non-transitory computer readable storage medium of claim 8, wherein the request further identifies:
  a tag associated with the notification, and
  at least one threshold associated with the tag.

12. The at least one non-transitory computer readable storage medium of claim 11, wherein, when the at least one threshold is satisfied, the steps further include:
  displaying a second notification associated with the at least one threshold.

13. The at least one non-transitory computer readable storage medium of claim 8, wherein causing the at least one application to initialize on the computing device comprises:
  causing the at least one application to initialize at least one hardware component utilized to obtain the input data.

14. The at least one non-transitory computer readable storage medium of claim 8, wherein the steps further include, subsequent to displaying the notification:
  receiving a second request to dismiss the notification; and
  storing the input data.

15. A computing device configured to implement a notification application, the computing device comprising:
  at least one processor; and
  at least one memory storing instructions that, when executed by the at least one processor, cause the computing device to:
    receive a request to create a notification, wherein the request identifies:
      at least one condition that dictates when the notification is to be displayed, and
      at least one type of input data to be provided when the at least one condition is satisfied, and
    identify at least one application associated with the at least one type of input data; and
    in response to determining that the at least one condition is satisfied:
      cause the at least one application to initialize on the computing device, and
      configure the at least one application to provide, to the notification application, input data that is received by at least one application and conforms to the at least one type of input data;
    receive the input data from the at least one application; and
    display the notification, wherein the notification includes the input data.

16. The computing device of claim 15, wherein the at least one condition is based on or more of a time, a date, or a location.

17. The computing device of claim 15, wherein the at least one processor further causes the computing device to, in response to identifying that the at least one condition is satisfied:
  update a configuration of the computing device to prevent other applications from loading until the notification is dismissed.

18. The computing device of claim 15, wherein the request further identifies:
  a tag associated with the notification, and
  at least one threshold associated with the tag.

19. The computing device of claim 18, wherein, when the at least one threshold is satisfied, the at least one processor further causes the computing device to:
  display a second notification associated with the at least one threshold.

20. The computing device of claim 15, wherein the at least one processor further causes the computing device to, subsequent to displaying the notification:
  receive a second request to dismiss the notification; and
  store the input data.

* * * * *